Patented Oct. 9, 1923.

1,469,994

UNITED STATES PATENT OFFICE.

FREDERICK G. BANTING AND CHARLES HERBERT BEST, OF TORONTO, ONTARIO, AND JAMES BERTRAM COLLIP, OF EDMONTON, ALBERTA, CANADA, ASSIGNORS TO THE GOVERNORS OF THE UNIVERSITY OF TORONTO, OF TORONTO, ONTARIO, CANADA.

EXTRACT OBTAINABLE FROM THE MAMMALIAN PANCREAS OR FROM THE RELATED GLANDS IN FISHES, USEFUL IN THE TREATMENT OF DIABETES MELLITUS, AND A METHOD OF PREPARING IT.

No Drawing.     Application filed January 12, 1923. Serial No. 612,158.

*To all whom it may concern:*

Be it known that we, FREDERICK G. BANTING and CHARLES HERBERT BEST, of the city of Toronto, in the county of York and Province of Ontario, Dominion of Canada, and JAMES BERTRAM COLLIP, formerly of the said city of Toronto, and now of the University of Alberta, in the city of Edmonton, in the Province of Alberta, Dominion of Canada, British subjects, have invented an extract obtainable from the mammalian pancreas or from the related glands of fishes, useful in the treatment of diabetes mellitus, and a method of preparing it; and we hereby declare that the following is a full, clear, and exact description of the same, this application being a substitution in part of the application filed by the said JAMES BERTRAM COLLIP and CHARLES HERBERT BEST on the 22d day of May, 1922, Serial No. 562,835.

Previous investigators suggested that the ductless portion of such glands as the mammalian pancreas and the pancreas of cartilaginous fishes, known as the isles of Langerhans, and related glands (principal islets) of bony fishes contains an internal secretion or hormone capable of alleviating diabetic symptoms in patients and in laboratory animals; and other conducted experiments in which diabetic patients and diabetic laboratory animals were given extracts containing this secretion or hormone.

The results of these experiments were not considered sufficiently satisfactory to justify the continued use of the extracts in the treatment of diabetes in man because of the presence in the extracts of toxic substances, and apparently no definite progress was made towards the preparation of an extract sufficiently pure to be safely administered to human patients until these experiments were continued by us. From our knowledge of the results in the early experiments we concluded that the presence of toxic substances in the extract caused local irritation followed by general reactions unrelated to the physiological and therapeutic effects of the hormone, and these conclusions were confirmed by our early clinical observations. We, therefore, deemed it advisable before further clinical trials were undertaken to prepare the extract containing the secretion or hormone in practically pure form and to devise suitable means for obtaining the maximum yield of it.

This was done by extracting the internal secretion or hormone from the fresh pancreas of mammalia, or, from the fresh pancreas of cartilaginous fishes, or, from fresh related glands, (principal islets), of bony fishes, with a solvent capable of preserving the activity of the internal secretion or hormone and then separating it practically free from injurious substances including inert associated gland tissue, proteins, proteolytic enzymes, salts and lipoids.

The following are steps we employed in several methods for obtaining a practically pure extract from the fresh pancreas of mammalia:

(1) Separation of the internal secretion or hormone from the fresh pancreas by extraction with solvents such as ethyl alcohol, methyl alcohol, methylated spirits, and acetone, or any mixture of these, which are capable of preserving the activity of this internal secretion or hormone by not destroying it and by largely preventing or inhibiting the deleterious action on it of such proteolytic enzymes as trypsin, erepsin, and the proteases, and of other catalysts present, followed by filtration for the removal of the inert associated gland tissue.

(2) Removal of the major part of the proteins by some suitable method of precipitation. For this purpose alcohol, colloidal iron, precipitation at isoelectric point by the use of dilute acid or alkali, or heating to a suitable temperature, may be used.

(3) Concentration of the extracted filtered solution, either before or after the removal of the proteins, as by distillation in vacuo, or evaporation in a dry air current.

(4) Removal of the lipoids after concentration either by mechanical separation or by chemical extraction with solvents such as ether, or toluol.

(5) Removal of the salts and a large part of the remaining impurities by precipitation with alcohol.

(6) Precipitation of the internal secretion or hormone with adherent substances by a higher percentage of alcohol and collection of the precipitate on a filter.

(7) Dissolving the precipitate in freshly distilled water, removing the admixed alcohol from this solution, and concentrating it, as by vacuum distillation, followed by sterilization of the resulting aqueous solution.

A potent preparation of the extractive of the internal secretion or hormone of the pancreas of mammalia was prepared as follows:

The fresh pancreas of the ox was minced and then mixed with an equal volume of alcohol. The mixture was strained and filtered to separate the inert associated gland tissue from the substances which had gone into solution in the alcohol. The filtrate was treated with two volumes of the same solvent and allowed to stand several hours with occasional agitation. The greater bulk of the protein was precipitated by this treatment and the resulting precipitate was removed by filtration and this filtrate subjected to vacuum distillation to obtain a concentrated aqueous solution. A buffer solution of ½ c. c. of 4% $NaHCO_3$ solution was added for every 5 litres of filtrate before distillation was commenced, to keep the hydrogen ion concentration within the $p$H range 4 to 7. The concentrated aqueous solution was twice extracted with ether. The lipoid substances were removed by this treatment. The ether was separated mechanically and the aqueous solution was returned to the vacuum still and concentrated further. Alcohol was then added to make this concentrated solution 80% alcohol and the mixture was thoroughly agitated. The greater bulk of the saline substances were "salted out" by this treatment and there was also precipitation of more protein. It was then centrifuged. After centrifuging four distinct layers were manifested in the tube. The uppermost layer was perfectly clear and consisted of alcohol holding all the internal secretion or hormone in solution. Below this in order were a flocculent layer of protein, a second clear or watery layer saturated with salt, and a lowermost layer consisting of crystals of salt. The upper most layer was next siphoned off and treated with several volumes of 95% ethyl alcohol. The foregoing treatments with alcohol caused fractional precipitation in which the earlier fractions were composed of precipitated proteins and salts and the last fraction was the internal secretion or hormone. The mixture was allowed to stand some hours. The precipitate was caught on a Buchner funnel washed with 95% alcohol and finally dissolved in distilled water. The resulting aqueous solution of the precipitate was then concentrated to the desired degree by vacuum distillation at low temperature and filtered through a Berkfeld filter to sterilize it. A preservative such as tri-cresol was added, the concentration of the same not exceeding 0.7 per cent.

A potent preparation of the extractive of the internal secretion or hormone of the pancreas of cartilaginous fishes and of related glands, principal islets, of bony fishes was obtained as follows:

The fresh gland was removed, cut in small pieces and placed in an equal volume of commercial alcohol. The mixture was allowed to stand at low temperature for several hours, after which the fluid was decanted and the gland tissue or solid residue ground to a fine pulp. The decanted fluid was then added gradually to the pulp with which it was thoroughly mixed by trituration to extract the internal secretion or hormone. The mixture was then strained to separate the pulpified gland tissue from the substance which had gone into solution in the alcohol, and the strained fluid filtered. The residue from this treatment was again extracted as above with fifty per cent alcohol and strained and filtered and the filtrate added to the first one. The alcohol was removed from the combined filtrates by distillation. The resulting aqueous solution was extracted by the use of ether for the removal of lipoids. The clear lipoid-free aqueous solution was then run off from under the ether and transferred to a wide beaker placed on a boiling bath so as to rapidly raise the temperature of the aqueous solution to between 70° and 75° C. at which it was maintained for 3 minutes with constant agitation of the beaker. By this treatment a flocculent precipitate of protein was thrown down and that portion of the ether which went into solution in the water was got rid of. The heated aqueous solution was then cooled, and filtered first through paper and then through a Berkfeld filter to sterilize it.

From each of the above mentioned glands we obtained by the foregoing methods, a potent pancreatic product or extract in sufficiently pure concentrated form for repeated administration to human patients and which had the physiological and therapeutic characteristics of removing the cardinal objective symptoms of diabetes mellitus in patients and reducing the percentage of blood sugar in laboratory animals, and which has a distinct value in the treatment of diabetes mellitus, and lowering blood sugar, decreasing the urinary sugar, checking acidosis and raising the carbohydrate tolerance of a diabetic individual to whom they are suitably administered.

Having thus fully described our invention what we claim as new and desire to secure by Letters Patent is

1. A substance prepared from fresh pancreatic or related glands containing in concentrated form the extractive from the ductless portion of the glands sufficiently free from injurious substances for repeated administration and having the physiological characteristics of causing a reduction of blood sugar useful for the treatment of diabetes mellitus.

2. A substance prepared from fresh pancreatic or related glands containing in concentrated form the extractive from the ductless portion of the gland practically free from injurious substances and having the physiological characteristics of causing a reduction of blood sugar useful for the treatment of diabetes mellitus.

3. A substance prepared from fresh pancreatic or related glands containing in concentrated form the extractive from the ductless portion of the gland practically free from inert associated gland tissue and injurious substances and having the physiological characteristics of causing a reduction of blood sugar useful for the treatment of diabetes mellitus.

4. A substance preperad fron. fresh pancreatic or related glands containing in concentrated form the extractive from the ductless portion of the gland practically free from proteins and other injurious substances and having the physiological characteristics of causing a reduction of blood sugar useful for the treatment of diabetes mellitus.

5. A method for obtaining a potent substance from the ductless portion of pancreatic or related glands in concentrated form and practically free from impurities having the hereindescribed physiological characteristics, which consists of extracting said substance from a fresh gland with a solvent capable of preserving the activity of the substance, precipitating said substance from the solution practically free from injurious substances, and making a sterile aqueous solution of said substance.

6. A method for obtaining a potent substance from the ductless portion of pancreatic or related glands in concentrated form and practically free from impurities having the hereindescribed physiological characteristics, which consists of extracting said substance from a fresh gland with a solvent capable of preserving the activity of the substance, precipitating said substance from the solution practically free from injurious substances, and making a concentrated sterile aqueous solution of said substance.

7. A method for obtaining a potent substance from the ductless portion of pancreatic or related glands in concentrated form and practically free from impurities having the hereindescribed physiological characteristics, which consists of extracting said substance from a fresh gland with a solvent capable of preserving the activity of the substance, precipitating said substance from the solution practically free from proteins and other injurious substances and making a sterile aqueous solution of said substance.

8. A method for obtaining a potent substance from the ductless portion of pancreatic or related glands in concentrated form and practically free from impurities having the hereindescribed physiological characteristics, which consists of extracting said substance from a fresh gland with a solvent capable of preserving the activity of the substance, fractionally precipitating said substance from the solution practically free from injurious adherent substances, and making a sterile aqueous solution of said substances.

Dated at the said city of Toronto, this 19th day of December, A. D. 1922.

FREDERICK G. BANTING.
CHARLES HERBERT BEST.
JAMES BERTRAM COLLIP.

Witnesses:
 CHAS. H. RICHES,
 ROBERT McCLINTOCK.